(12) United States Patent
Shimizu et al.

(10) Patent No.: US 8,506,411 B2
(45) Date of Patent: Aug. 13, 2013

(54) GAME SYSTEM WITH ENHANCED LOW POWER MODE-RELATED PROCESSING

(75) Inventors: Takao Shimizu, Kyoto (JP); Toshiaki Suzuki, Kyoto (JP); Toshihiko Nakago, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2378 days.

(21) Appl. No.: 10/265,159

(22) Filed: Oct. 7, 2002

(65) Prior Publication Data

US 2003/0092493 A1    May 15, 2003

(30) Foreign Application Priority Data

Nov. 13, 2001 (JP) .................................. 2001-347539

(51) Int. Cl.
*A63F 13/00* (2006.01)
(52) U.S. Cl.
USPC ............................................................ 463/43
(58) Field of Classification Search
USPC ...... 463/1–69; 320/127; 340/636; 307/10.1
See application file for complete search history.

(56) References Cited

U.S. PATENT DOCUMENTS

| | | | | |
|---|---|---|---|---|
| 3,941,989 A * | 3/1976 | McLaughlin et al. | ........ | 713/321 |
| 4,542,903 A | 9/1985 | Yokoi et al. | | |
| 5,059,961 A * | 10/1991 | Cheng | ............................. | 345/10 |
| 5,067,079 A * | 11/1991 | Smith et al. | ........................ | 463/3 |
| 5,371,693 A * | 12/1994 | Nakazoe | ....................... | 713/321 |
| 5,448,262 A * | 9/1995 | Lee et al. | ....................... | 345/212 |
| 5,621,401 A * | 4/1997 | Jeon et al. | ...................... | 713/321 |
| 5,630,144 A * | 5/1997 | Woog et al. | .................... | 713/310 |
| 5,821,924 A * | 10/1998 | Kikinis et al. | ................. | 713/324 |
| 5,880,719 A * | 3/1999 | Kikinis | .......................... | 713/324 |
| 6,006,335 A * | 12/1999 | Choi et al. | ..................... | 713/310 |
| 6,037,748 A * | 3/2000 | Yee et al. | ....................... | 320/127 |
| 6,072,472 A * | 6/2000 | Shiga | ............................. | 713/320 |
| 6,213,879 B1 * | 4/2001 | Niizuma et al. | ................. | 463/36 |
| 6,238,291 B1 * | 5/2001 | Fujimoto et al. | ................ | 463/44 |
| 6,279,048 B1 | 8/2001 | Fadavi-Ardekani et al. | | |
| 6,504,534 B1 * | 1/2003 | Takase et al. | ................. | 715/867 |
| 2002/0000984 A1 * | 1/2002 | Asai et al. | ...................... | 345/211 |

FOREIGN PATENT DOCUMENTS

JP        10-174741        6/1998

OTHER PUBLICATIONS

Himowitz, Michael. "Blankers Useful." The Baltimore Sun, Herald, p. 6B. 1991.*

(Continued)

*Primary Examiner* — Dmitry Suhol
*Assistant Examiner* — Jason Yen
(74) *Attorney, Agent, or Firm* — Nixon & Vanderhye P.C.

(57) ABSTRACT

A TV game machine is connected to a portable game machine being used as a controller. If no operations have been carried out by a user to the portable game machine, the portable game machine sends a sleep request to the TV game machine, and then enters sleep mode. On receiving the sleep request, the TV game machine causes a message to be displayed on a display, and notifies a user that the portable game machine is being operated in sleep mode. This screen display continues until the portable game machine returns from the sleep mode. Thus, it is possible to prevent the user who sees the portable game machine in sleep mode from erroneously believing that the portable game machine is turned off and then operating a power button to turn it on.

18 Claims, 9 Drawing Sheets

(56) References Cited

OTHER PUBLICATIONS

Andrews, Paul. "From Silly to Sublime, There's a Screen Saver for Everyone." Seattle Times, p. D2. 1993.*

Pitta, Julie. "The Cutting Edge: Computing / Technology / Innovation; Service Offers Info in Screen-Saver Format." Los Angeles Times, p. 4. 1996.*

PC World. "Most Popular Screen Savers." 2005. [retrieved Aug. 11, 2005] <URL: http://www.pcworld.com/downloads/collection/0,collid,1248,sortidx,1,pg,10,00.asp>.*

"News Article: The D-Pad Not Dead?", Planet GameCube, 1 page, Aug. 6, 2000.

European Office Action dated Aug. 22, 2006.

* cited by examiner

FIG. 9
DURING GAME
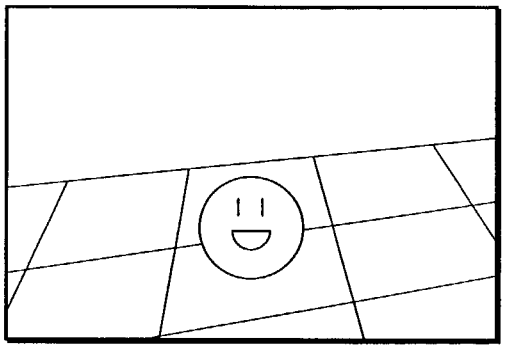
↓ TO SLEEP
DURING SLEEP
CONTROLLER IS NOW SLEEPING.
PLEASE PRESS ANY KEY.
↓ SLEEP RELEASED
DURING GAME
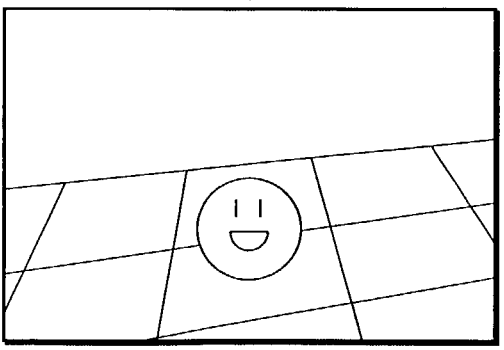

F I G. 1 0
DURING GAME
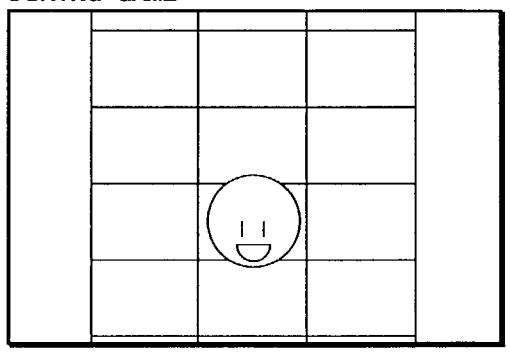
↓ TO SLEEP
DURING SLEEP
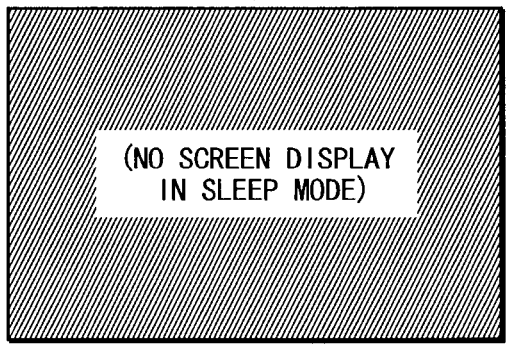
(NO SCREEN DISPLAY IN SLEEP MODE)
↓ SLEEP RELEASED
DURING GAME
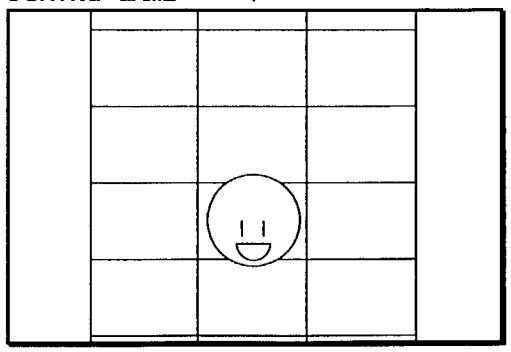

GAME SYSTEM WITH ENHANCED LOW POWER MODE-RELATED PROCESSING

This application claims priority to Japanese Application No. JP 2001-347539, filed Nov. 13, 2001, the entire contents of which are hereby incorporated by reference.

FIELD OF THE INVENTION

The present invention generally relates to video game systems. More specifically, the present invention relates to a game system in which a first game machine is connected to at least a single second game machine as a controller for game processing wherein low power mode related operations are performed.

BACKGROUND AND SUMMARY OF THE INVENTION

Game machines can be broadly divided into the categories of non-portable game machines and portable (handheld) game machines. A non-portable game machine, which is generally called a TV game machine, performs game processing based on executing a game program recorded on a recording medium such as an optical disk, and displays a resulting game screen on a home television receiver or the like. A portable game machine is smaller in size than a non-portable machine, executing game processing based on a game program typically stored in a cartridge-type recording medium. The portable game machine displays a resulting game display on a display screen section provided on the portable game machine body.

In general, the non-portable game machine is provided with a dedicated controller having a plurality of operation buttons, joystick or the like for enabling a user to control game play operations. The dedicated controller transmits the state of these operation buttons, joystick or the like to the game machine body, which can thus use the state information to control game operation in accordance with how the user has operated the dedicated controller.

A game system currently exists in which a portable game machine is used as a controller for a non-portable game machine. The portable game machine is generally provided with a plurality of operation control buttons or switches. The state of the operation buttons on the portable game machine is coupled to the non-portable game machine connected thereto via a communications cable. In this way, the portable game machine is used as a controller. Furthermore, the portable game machine generally includes not only operation buttons but also a display unit, a loudspeaker, and other components. With these components, images and sounds are output during game play. Such a game system enables a new type of game play. For example, a display of a television receiver connected to the non-portable game machine produces a game image containing a game character viewed by a player disposed adjacent to and across from the display, while a display of the portable game machine produces a game image containing the same game character generally viewed by a player looking down at the display screen. Such displays can produce images containing different information.

Generally, the non-portable game machine is powered by a home power supply, and the dedicated controller is powered through the non-portable game machine and the communications cable. Therefore, the user can temporarily suspend the game for a relatively long time and leave the dedicated controller without concerns about power consumption. When a portable game machine is used as a controller for a video game system, the portable game machine is generally powered by an internal battery. Therefore, if the user temporarily suspends the game and leaves the portable game machine for a long time, the battery power is unnecessarily consumed. If the battery runs down, the user can no longer play the game using the portable game machine until the battery is replaced or recharged. The user may lose game data generated during the course of game play held in a volatile memory of the portable game machine. To avoid such problems, the user has to cut battery consumption to a minimum when suspending game play.

Cutting battery consumption can be achieved by, for example, operating the portable game machine in power-saving mode while game is being suspended. In power-saving mode, the portable game machine only carries out minimum-required processing (for example, holding game data, and waiting for an interrupt for returning from power-saving mode). In such a power saving mode, the portable game machine does not, for example, carry out image display or sound output.

The above-described power-saving mode has its drawbacks. For example, while the portable game machine is being operated in power-saving mode as described above, no image or sound is produced. Therefore, the user returning to the portable game machine or another person may erroneously think that the portable game machine is left turned off, and try to turn the machine on by operating a power key. Operation of the power key at this moment actually causes the machine to be turned off and, consequently, the game data will possibly be lost. Also, a user who returns to the portable game machine but desires to end the game without resuming play may forget to turn the portable game machine off and leave, thereby wasting the battery.

When the portable game machine is used as the controller for the non-portable game machine, the portable game machine may receive home power supply through the non-portable game machine, as is the case for the dedicated controller. In this case, the battery is not used. In this configuration, the portable game machine does not have to be switched to power-saving mode. Still, in order to prevent a burn on the display of the portable game machine, it is desirable to operate the portable game machine in a mode where image outputs on the display are suspended if no operations have been carried out for a predetermined period (such a mode is hereinafter referred to as burn-resistant mode).

Like the above power-saving mode, while the portable game machine is being operated in burn-resistant mode, no image or sound is produced. Therefore, the user returning to the portable game machine or another person may erroneously think that the portable game machine is left turned off, and try to turn the machine on by a power key operation. Operation of the power key at this point causes the machine to be turned off. Consequently, the game data will possibly be lost.

Therefore, a feature of an exemplary embodiment of the present invention is to provide a game system in which a game machine is connected to at least another single game machine for use as a controller for game processing. In the game system, when the other game machine used as the controller is switched from normal game-processing mode to power-saving mode or burn-resistant mode, it is possible to effectively prevent an erroneous operation that would otherwise be carried out by a user who is unaware of the mode switching.

An exemplary embodiment described below includes reference numbers or step numbers in parentheses to indicate a relationship to the drawings associated herewith.

According to a first aspect of the exemplary embodiments, in a game system, a first game machine (for example, TV game machine 100 in the embodiment) is connected to a second game machine (portable game machine 200) for use as a controller for game processing. The game system includes a no-operation detector (CPU 21 executing step S101 through S108; hereinafter only step numbers are shown), a mode switching mechanism (S301), and a notifying mechanism (S404). The no-operation detector detects that the second game machine has not been operated by a user for a predetermined period. The mode switching mechanism switches, upon receipt of the detection result from the no-operation detector, a change in operation mode of the second game machine from normal game processing mode to no-operation mode. The notifying mechanism is provided on the first game machine, for notifying the user through an image or sound that the second game machine is being operated in the no-operation mode. Thus, the user can be notified through an image or sound that the operation mode of the second game machine is switched to the no-operation mode. Therefore, it is possible to effectively prevent an erroneous operation that would otherwise be carried out by the user unaware that the second game machine is being operated in the no-operation mode.

According to a second feature of an exemplary embodiment, the first game machine is operated by a home power supply, the second game machine is operated by a battery, and the no-operation mode is a power-saving mode for reducing power consumption from the battery by limiting an operation of the second game machine. Thus, it is possible to prevent wasting battery power, and also to effectively prevent an erroneous operation that would otherwise be carried out by the user.

According to a third feature of an exemplary embodiment, the second game machine includes a display section (display unit 24) for displaying a game screen. In the power-saving mode, the screen display on the display unit is suspended. Thus, it is possible to effectively prevent wasting battery power, and also prevent an erroneous operation that would otherwise be carried out by the user.

According to a fourth feature of an exemplary embodiment, the second game machine includes a display section (display unit 24) for displaying a game screen. The no-operation mode is a burn-resistant mode for preventing a burn on the display section by suspending a screen display on the display section. Thus, it is possible to prevent a burn on the display section, and also to effectively prevent an erroneous operation that would otherwise be carried out by the user.

According to a fifth feature of an exemplary embodiment, when the notifying mechanism notifies the user that the second game machine is being operated in the no-operation mode, the notifying mechanism further notifies the user of a procedure for returning the operation mode of the second game machine from the no-operation mode to the normal game processing mode. Thus, even when a specific procedure is required for returning to the normal game processing mode (for example, when a predetermined button should be pressed), the user can assuredly return to the operation mode.

According to a sixth feature of an exemplary embodiment, the notifying mechanism notifies the user that the second game machine is being operated in the no-operation mode by causing a predetermined message to be displayed. Thus, the user can assuredly know through the message that the second game machine is being operated in the no-operation mode.

According to a seventh feature of an exemplary embodiment, the notifying mechanism notifies the user that the second game machine is being operated in the no-operation mode through an image with representation different from the image displayed in the normal game processing mode. Thus, the user can intuitively know that the second game machine is being operated in the no-operation mode by a change in the displayed image (for example, an animated sleeping character is displayed, or the background of the game takes on the images of night scenery).

According to an eighth feature of an exemplary embodiment, the notifying mechanism notifies the user that the second game machine is being operated in the no-operation mode through sound different from the sound produced in the normal game processing mode. Thus, the user, for example, can know that the second game machine is being operated in the no-operation mode through the sound without seeing the display screen.

According to a ninth feature of an exemplary embodiment, the second game machine has, for example, a plurality of operation buttons (input unit 26), and the no-operation detector detects that the second game machine has not been operated by the user for a predetermined period upon determining that the state of the plurality of buttons has not been changed for the predetermined period. Thus, in a game played with the user operating such operation buttons, it is possible to know that the user has suspended the game and, for example, left the game machine unattended.

According to a tenth feature of an exemplary embodiment, the second game machine has an acceleration sensor (acceleration sensor incorporated in a game cartridge 25) incorporated therein. The no-operation detector detects that the second game machine has not been operated by the user for a predetermined period when values detected by the acceleration sensor for a predetermined period are within a predetermined range. Thus, mainly in a game to be played with the user tilting and shaking the second game machine, it is possible to know that the user has suspended game play and, for example, left the game machine unattended.

According to an eleventh feature of an exemplary embodiment, the first game machine is connected to a plurality of said second game machines, and the notifying mechanism notifies the user through an image or the sound only when all of the second game machines are being operated in a no-operation mode. Thus, when a plurality of users play the game together, even if one of them suspends the play and leaves his or her game machine, the others can continue playing the game without suspension.

According to a twelfth feature of an exemplary embodiment, a game machine (100) can be removably connected to at least another single game machine (200) as an operation controller. The other game machine's operation mode can be switched from normal game processing mode to no-operation mode when no operations have been carried out by a user for a predetermined period. The game machine includes an operation mode detector (S401) and notifying mechanism (S404). The operation mode detector detects the operation mode of the other game machine. The notifying mechanism notifies the user that the other game machine is being operated in the no-operation mode through an image or sound. Thus, the user can be notified through an image or sound that the operation mode of the other game machine is switched to the no-operation mode. Therefore, it is possible to effectively prevent an erroneous operation that would otherwise be carried out by the user unaware that the second game machine is being operated in the no-operation mode.

According to a thirteenth feature of an exemplary embodiment, based on a sleep request signal from the other game machine, the operation mode detector detects that the operation mode of the other game machine is switched from the normal game processing mode to the no-operation mode. Thus, it can be detected that the operation mode of the other game machine has been switched from the normal game processing mode to the no-operation mode.

According to a fourteenth feature of an exemplary embodiment, a game program to be executed on a game machine (100) can be removably connected to at least another single game machine (200). The other game machine's operation mode can be switched from normal game processing mode to a no-operation mode when no operations have been carried out by a user for a predetermined period. The game machine uses the other game machine as an operation controller. The game program causes the game machine to execute an operation mode detecting step and a notifying step. In the operation mode detecting step, the operation mode of the other game machine is detected. In the notifying step, the user is notified through an image or sound that the other game machine is being operated. Thus, the user can be notified through an image or sound that the operation mode of the other game has been switched to the no-operation mode. Therefore, it is possible to effectively prevent an erroneous operation that would otherwise be carried out by the user unaware that the second game machine is being operated in the no-operation mode. Note that, the game program may be supplied to the game machine through a recording medium readable by a game machine computer, or may be supplied thereto through a communications line.

According to a fifteenth feature of an exemplary embodiment, a game program is to be executed on a game machine (200) capable of being used as an operation controller removably connected to another game machine (100) for game processing, The game program causes the game machine (200) to execute a no-operation detecting step, a mode switching step (S301), and a notifying step (S201). In the no-operation detecting step, it is detected that no operations have been carried out by a user to the game machine (200) for a predetermined period. In the mode switching step, an operation mode of the game machine (200) is switched from normal game processing mode to no-operation mode based on the detection result in the no-operation detecting step. In the notifying step, the other game machine (100) is notified with a sleep request signal that the operation mode of the game machine (200) has been switched to the no-operation mode. Thus, the other game machine can be notified that the operation mode of the game machine used as the operation controller has been switched to the no-operation mode, and the user can also be notified as such through an image or sound. Therefore, it is possible to effectively prevent an erroneous operation that would otherwise be carried out by the user unaware that the game machine used as the operation controller is being operated in the no-operation mode.

According to a sixteenth feature of an exemplary embodiment, a game processing method for use in a game system in which a first game machine (100) is connected to at least a single second game machine (200) as an operation controller for game processing. The method includes a no-operation detecting step (S101 through S108), a mode switching step (S301), and a notifying step (S404). In the no-operation detecting step, it is detected that no operations have been carried out by a user to the second game machine. In the mode switching step, an operation mode of the second game machine is switched from normal game processing mode to no-operation mode based on the detection result in the no-operation detecting step. In the notifying step, which is carried out by the first game machine, the user is notified through an image or sound that the second game machine is being operated in the no-operation mode. Thus, the user can be notified through an image or sound that the operation mode of the second game machine has been switched to the no-operation mode. Therefore, it is possible to effectively prevent an erroneous operation that would otherwise be carried out by the user unaware that the second game machine is being operated in the no-operation mode.

These and other objects, features, aspects and advantages of the exemplary embodiments will become more apparent from the following detailed description of the present invention when taken in conjunction with the accompanying drawings.

BRIEF DESCRIPTION OF THE DRAWINGS

FIG. 9 is an illustration of an example of a screen display on a display 40 connected to the TV game machine 100; and FIG. 10 is an illustration showing a display unit 24 of the portable game machine 200.

DESCRIPTION OF THE PREFERRED EMBODIMENT

With reference to the drawings, described below is one exemplary embodiment according to the present invention.

Figure 1:
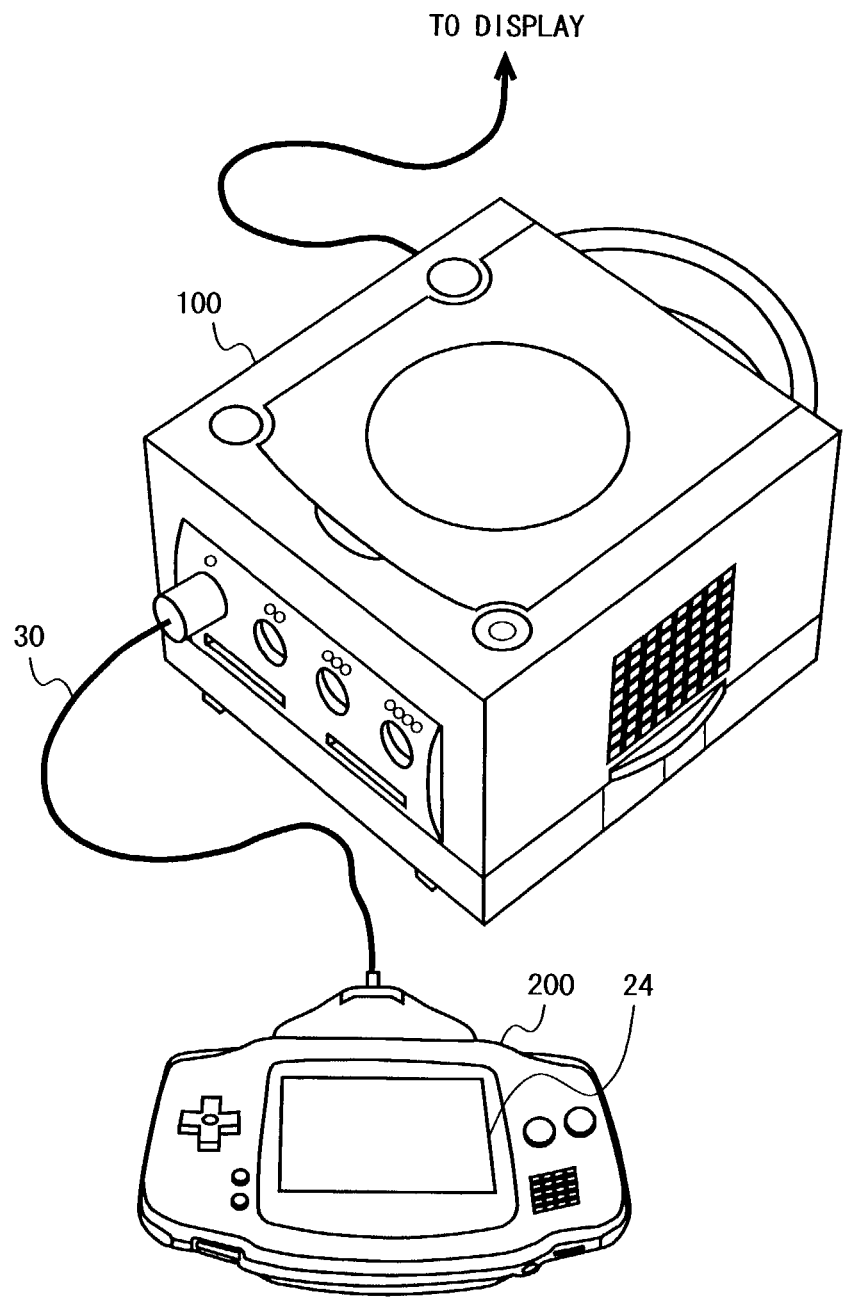
FIG. 1 is an external view illustrating the configuration of a game system according to an embodiment of the present invention.

FIG. 1 is an external view of a configuration of a game system according to an embodiment of the present invention. The present game system includes a TV game machine 100, a portable game machine 200, a communications cable 30, and a display, which may, for example, be a television receiver (not shown). The TV game machine 100 is powered by home power supply, and the portable game machine 200 is powered by a battery. The TV game machine 100 and the portable game machine 200 independently execute their respective game programs. A game screen is independently displayed on both the TV display (not shown) and the display unit 24 of the portable game machine 200. The user watches both of the game screens alternately to enjoy the game and uses the portable game machine 200 as the operation controller of the TV game machine 100.

Figure 2:
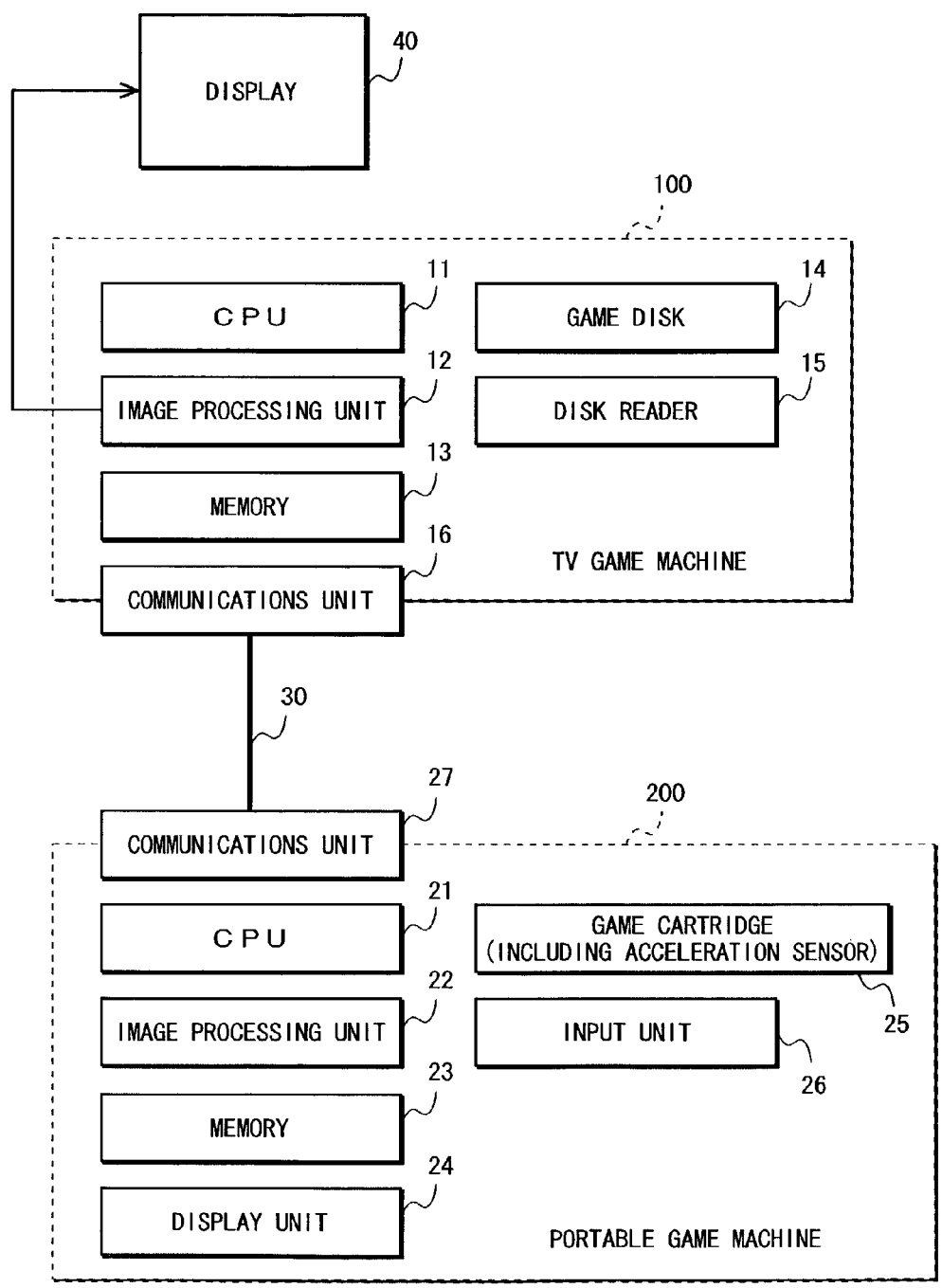
FIG. 2 is a block diagram illustrating the configuration of the game system according to the embodiment of the present invention.

FIG. 2 is a functional block diagram showing the configuration of the game system. In FIG. 2, the components similar in structure to those in FIG. 1 are provided with the same reference numerals. In FIG. 2, the present game system includes the TV game machine 100, the portable game machine 200, the communications cable 30, and a display 40 (the one not shown in FIG. 1). The TV game machine 100 includes a CPU 11, an image processing unit 12, memory 13, a game disk 14, a disk reader 15, and a communications unit 16. The portable game machine 200 includes a CPU 21, an image processing unit 22, memory 23, a display unit 24, a game cartridge 25 including an acceleration sensor, an input unit 26, and a communications unit 27.

In operation, a game disk 14 having a game program recorded thereon is removably inserted into the TV game machine 100. Although an expedient example of the game disk 14 is an optical disk, another recording medium may be used. The game program recorded on the game disk 14 inserted into the TV game machine 100 is read by the disk reader 15. The CPU 11 carries out game processing in accordance with the game program. The TV game machine 100 is connected to the portable game machine 200 via the communications cable 30, and periodically communicates with the portable game machine 200 through the communications unit 16. The connection for data communications between the TV game machine 100 and the portable game machine 200 may be made wirelessly. The TV game machine 100 is also connected to the display 40 for producing a game screen through the image processing unit 12. The memory 13 is used as required during the course of game processing, and includes a memory map as is described below.

A game cartridge 25 having a game program recorded thereon is removably inserted into the portable game machine 200. The CPU 21 carries out game processing in accordance with the game program. The game cartridge 25 has an acceleration sensor incorporated therein for detecting how the portable game machine 200 is tilted or vibrated. The input unit 26 provided on the portable game machine body includes a cross-shaped key and other various buttons. The user presses these key and buttons, or tilts or vibrates the body of the portable game machine 200 to cause a game character to take a specific action. The input unit 26 is not limited to such control buttons, but may be in the form of a joystick, a touch pad, or the like. The portable game machine 200 is connected to the TV game machine 100, and periodically engages in data communications with the TV game machine 100 through the communications unit 27. The portable game machine 200 is provided with display unit 24, which produces a game screen based on the image data generated by the image processing unit 22 during game processing. The memory 23 is used during the course of game processing, and includes a memory map as is described below.

The operation of the portable game machine 200 is described below with reference to the identified flowcharts.

Figure 3:
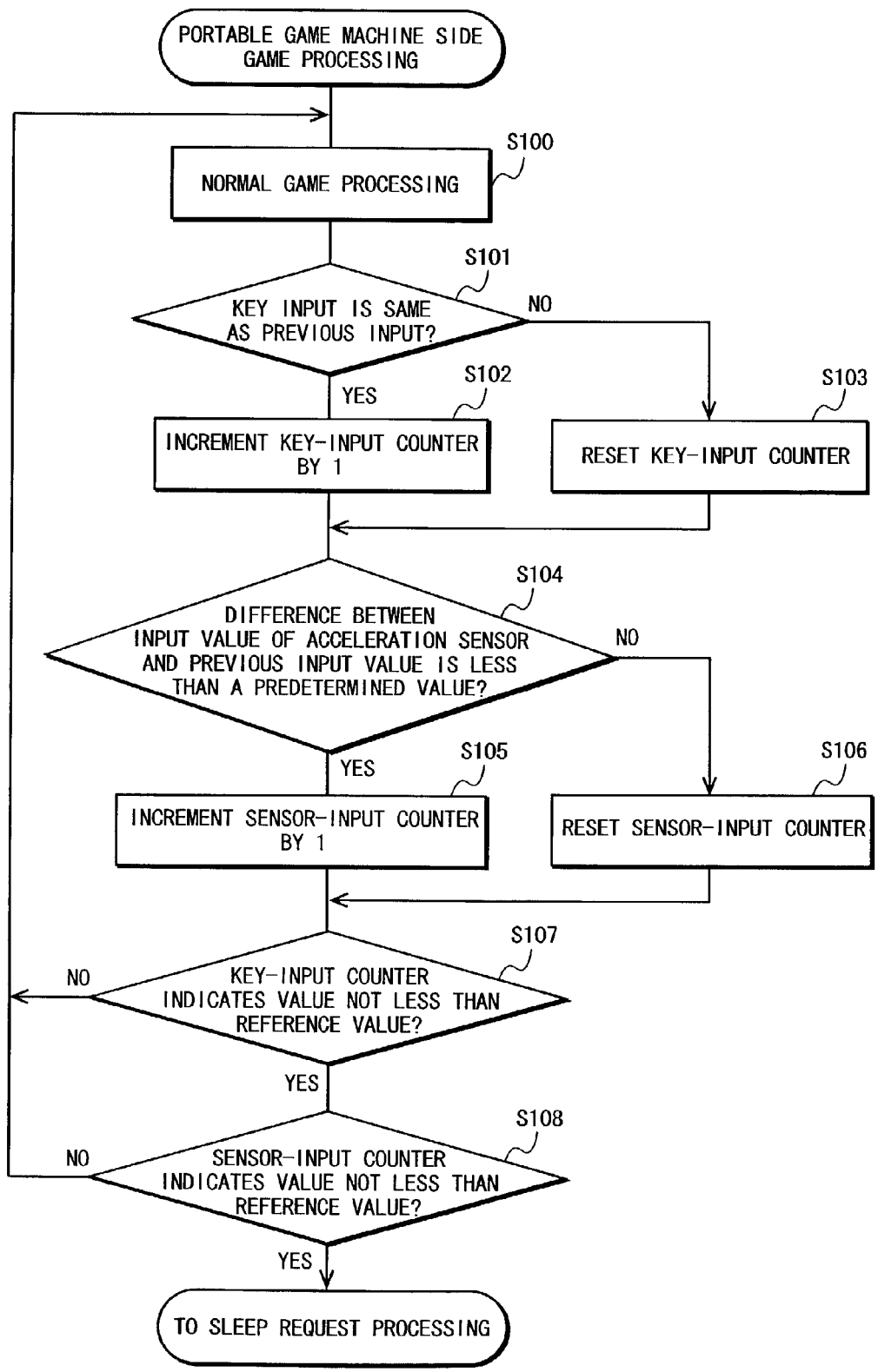
FIG. 3 is a flowchart showing the operation of a CPU 21 of a portable game machine 200 for game processing.

First, with reference to a flowchart of FIG. 3, the operation of the CPU 21 for normal game processing is described. Game processing is normally repeated sixty times per second. In step S100, CPU 21 carries out normal game processing. Then, in step S101, it is determined whether a key input (that is, the state of the buttons on input unit 26) is the same as the state in the previous game processing. If the key input has not been changed, a key-input counter is incremented (step S102). If the state has changed, the key-input counter is reset (step S103). Then, in step S104, it is determined whether the difference between an input value of the acceleration sensor (that is, a detected acceleration value) and the value during the previous game processing is less than a predetermined value. If the difference is less than the predetermined value, a sensor-input counter is incremented (step S105). Otherwise, the sensor-input counter is reset (step S106). In the present exemplary embodiment, what is determined herein is not whether there is any fluctuation in the value of the acceleration sensor, but whether the fluctuation is less than the predetermined value. This is because, even if the portable game machine 200 is left unoperated, the acceleration value is always fluctuating due to the high accuracy of the acceleration sensor. Next, in step S107, it is determined whether the value of the key-input counter is not less than a predetermined value, for example, 1800. If the value of the key-input counter is not less than the predetermined value, the processing proceeds to step S108. In step S108, it is determined whether the value of the sensor-input counter is not less than a predetermined value, for example, 1800. If the value of the sensor-input counter is not less than the predetermined value, the processing proceeds to sleep request processing. If the value of the key-input counter is less than the predetermined value in step S107 or if the value of the sensor-input counter is less than the predetermined value in step S108, the processing returns to step S100 for normal game processing, without entering sleep request processing. Note herein that, when the values of the key-input counter and the sensor-input counter indicate 1800, it means that the user has not operated the portable game machine 200 for thirty seconds.

Figure 4:
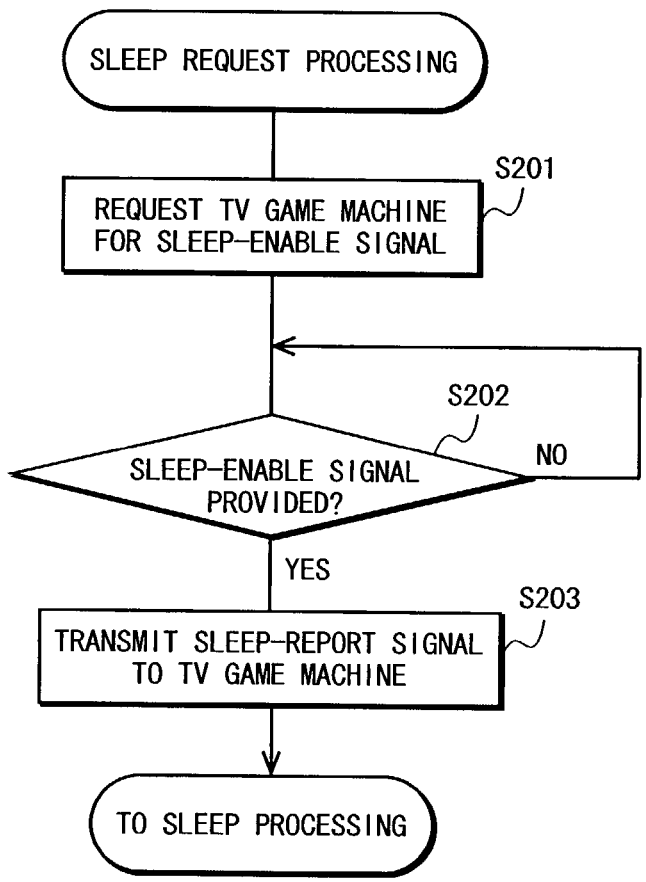
FIG. 4 is a flowchart showing the operation of the CPU 21 of the portable game machine 200 for sleep request processing.

With reference to a flowchart shown in FIG. 4, the operation of the CPU 21 during sleep request processing is described. In step S201, CPU 21 requests the TV game machine 100 for a sleep-enable signal. Then, CPU 21 waits for the sleep-enable signal to be sent (step S202). On receiving the sleep-enable signal, CPU 21 sends a signal for reporting to the TV game machine 100 that the portable game machine 200 will be operated in sleep mode (step S203). After sending the report signal, the routine enters the sleep processing routine.

Figure 5:
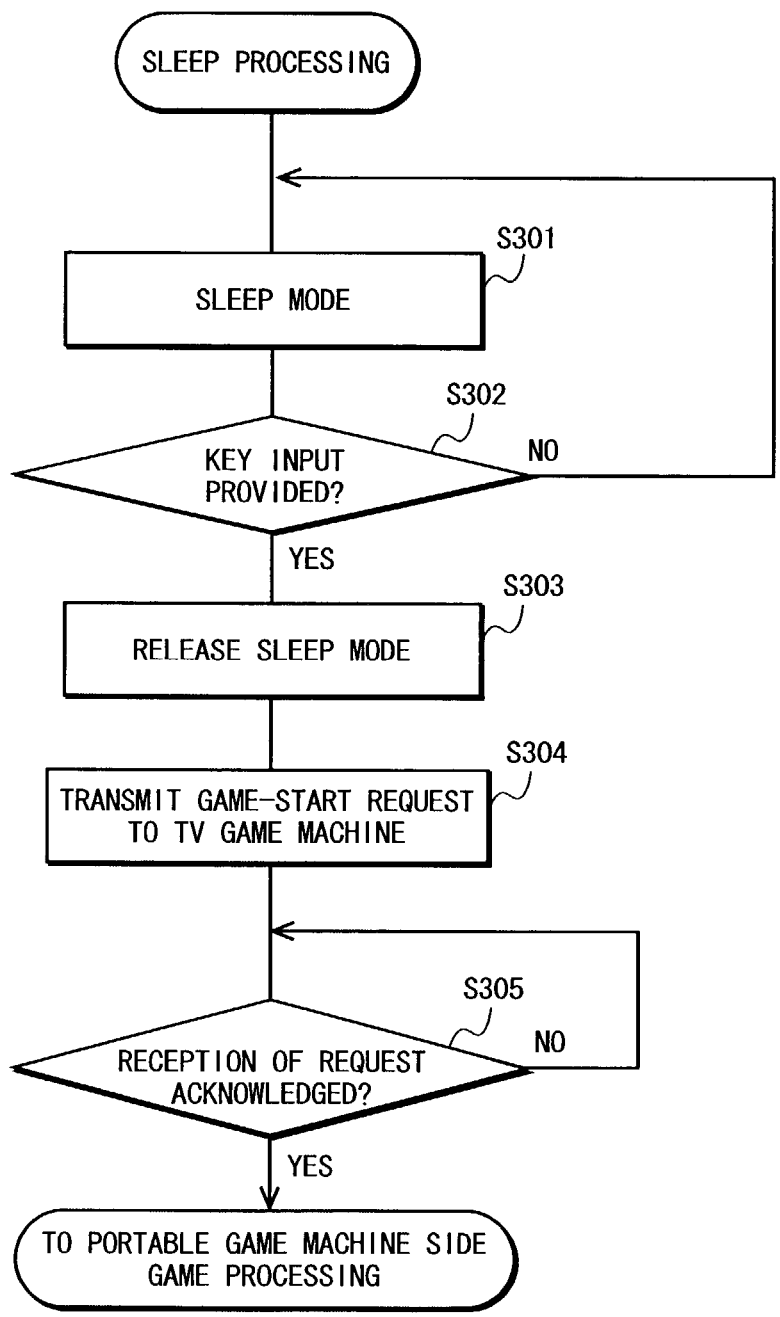
FIG. 5 is a flowchart showing the operation of the CPU 21 of the portable game machine 200 for sleep processing.

With reference to a flowchart shown in FIG. 5, the operation of the CPU 21 during sleep processing is described below. In step S301 and step S302, the CPU 21 operates in sleep mode (power-saving mode) until any key input is provided (for example, until any button is pressed). In sleep mode, at least the data during the course of game play is retained. When a specific key input is provided during the operation in sleep mode, CPU 21 releases the sleep mode (step S303). In the above exemplary embodiment, the processes in steps S301 to S303 are carried out by CPU 21. Alternatively, operation of the CPU 21 may be completely suspended in sleep mode. In this case, the sleep mode is released by a hardware component other than CPU 21. After the sleep mode is released in step S303, CPU 21 transmits a game start request to TV game machine 100. Once it is acknowledged that the TV game machine 100 has received the request (step S305), the processing returns to step S100 shown in FIG. 3 for normal game processing to restart the game in its state immediately before suspension.

Figure 6:
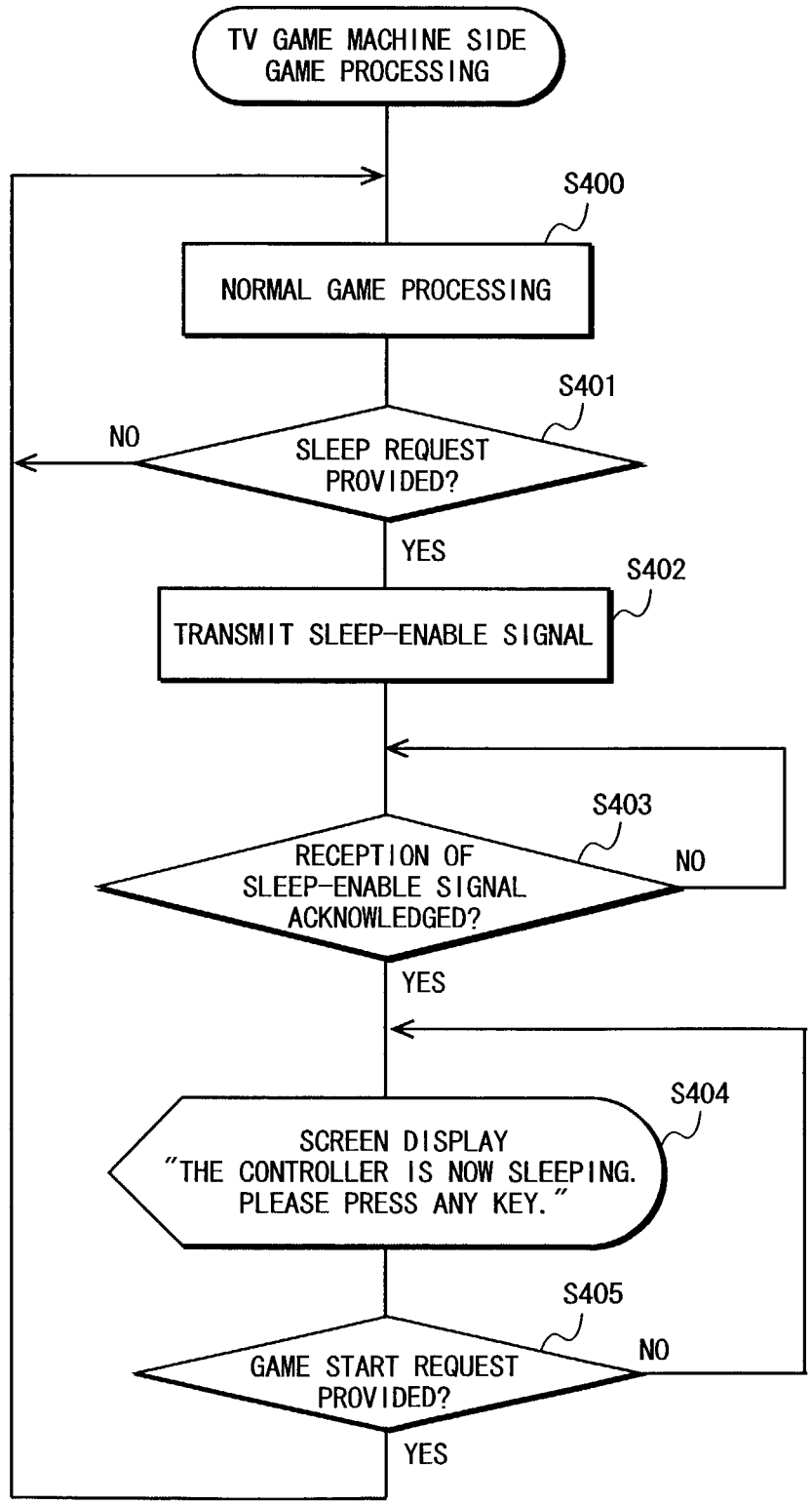
FIG. 6 is a flowchart showing the operation of a CPU 11 of a TV game machine 100.

With reference to the flowchart shown in FIG. 6, the operation of CPU 11 of the TV game machine 100 for the game processing is described. In step S400, CPU 11 carries out normal game processing. In step S401, the CPU 11 determines whether a sleep request has been provided by the portable game machine 200. If the sleep request has been provided, the processing goes to step S402. Otherwise, the processing branches back to step S400 for continuing normal game processing. With the sleep request provided by the portable game machine 200, CPU 11 returns a sleep-enable signal to the portable game machine 200 (step S402). Once it is acknowledged that the portable game machine 200 has received the request (step S403), CPU 11 causes the display 40 to indicate a message "The controller is now sleeping. Please press any key." on the screen, notifying the user that the portable game machine 200 is now being operated in sleep mode (step S404). This screen display continues until a game start request is received from the portable game machine 200 (step S405). Once the game start request is provided, the procedure returns to step S400 for restarting the normal game processing.

Described below are the memory maps of the memory 23 of the portable game machine 200 and memory 13 of the TV game machine 100.

Figure 7:
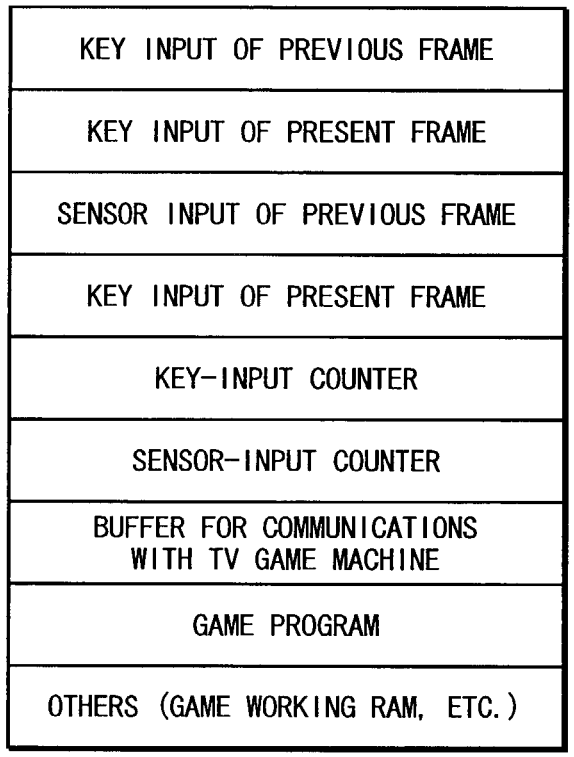
FIG. 7 is an illustration showing a memory map of memory 23 in the portable game machine 200.

FIG. 7 illustrates a memory map of memory 23 of the portable game machine 200. The memory 23 has an area for storing a key input of the previous frame, an area for storing a key input of the present frame, an area for storing a sensor input of the previous frame, an area for storing a sensor input of the present frame, an area for storing a value of the key-input counter, an area for storing a value of the sensor-input counter, a buffer area for communications with the TV game machine 100, an area for storing the game program, and other areas such as a game working RAM area.

Figure 8:
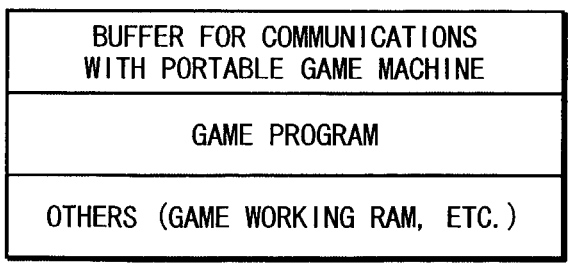
FIG. 8 is an illustration showing a memory map of memory 13 in the TV game machine 100.

FIG. 8 illustrates a memory map of memory 13 of the TV game machine 100. The memory 13 has a buffer area for communications with the portable game machine 200, an area for the game program, and other areas such as a game working RAM area.

Described below are examples of image displays on the display 40 and the display unit 24 when the operation mode of the portable game machine 200 is switched to the sleep mode during the course of game play, and is then returned to the normal game processing mode.

FIG. 9 illustrates one example of a screen display on display 40. During the game, the game screen is displayed on display 40. When the portable game machine 200 is switched into the sleep mode, the game is suspended, and then a message prompting the user to release the sleep mode is displayed, as illustrated in FIG. 9. If a specific procedure is required for releasing the sleep mode, it is preferable that the procedure be simultaneously displayed. Examples of the specific procedure are: pressing a predetermined button; shaking the body of the portable game machine 200; pressing a plurality of buttons simultaneously; and pressing a predetermined button in a predetermined manner. With the procedure being displayed, the user can reliably release the sleep mode without referring to manuals or other players. Note that it is preferable that a specific procedure be required for releasing the sleep mode for preventing an accidental releasing of the sleep mode. Therefore, the erroneous operation can be prevented where, for example, a person other than the user erroneously releases the sleep mode and restarts the game against the user's will. When the user sees the message and releases the sleep mode of the portable game machine 200, the game screen again appears on a display 40.

FIG. 10 illustrates one example of screen displays on the display unit 24. During the game, the game screen is displayed on display unit 24. If no operations have been made by the user for a predetermined period, the operation mode of the portable game machine 200 is switched to the sleep mode. In the sleep mode, no image outputs are produced from the display unit 24. Then, when the user sees the message on the display 40 and releases the sleep mode of the portable game machine 200, the game screen appears again on the display unit 24.

As described above, according to the present embodiment, if the user suspends the game for a long time, the operation mode of the portable game machine 200 is switched to the sleep mode, thereby preventing wasting the battery power. Also, while the portable game machine 200 is being operated in sleep mode, a message notifying the user of such appears on the display 40, thereby preventing the user or others from erroneously deciding that the portable game machine is left turned off. Therefore, such cases can be prevented as those where game data is lost due to an erroneous operation of turning off the portable game machine 200 or where the battery is wasted because the portable game machine 200 is left turned on.

In the present exemplary embodiment, it is detected that the user's operation has not been made for a predetermined period with reference to the key input and the value of the acceleration sensor. This is not meant to be restrictive, and only either one of the key input and the value of the acceleration sensor may be referred to for detection. Alternatively, sensors other than the acceleration sensor (for example, a pressure sensor, thermo sensor, distance sensor, magnetic sensor, or others) may be used for detecting the above when the detection value is not varied or varied less than a predetermined amount.

In the present illustrative embodiment, while the portable game machine 200 is being operated in sleep mode, the TV game machine 100 notifies the user by a message indicating that the portable game machine 200 is in sleep mode, on the display screen of the display 40. This is not meant to be restrictive, and the TV game machine 100 may notify the user of such in another manner. For example, predetermined background music (such as a lullaby) may be output from a loudspeaker provided on display 40. Alternatively, display 40 may display an animated sleeping character on the display screen. Still alternatively, the background of the game screen may take on the images of a night scenery.

In the present exemplary embodiment, the sleep mode is released by pressing any key. This is not meant to be restrictive, and another trigger for releasing the sleep mode may be a change in the state of the acceleration sensor. Therefore, it is possible to release the sleep mode by shaking the portable game machine 200 to wake up the sleeping character displayed on the screen in sleep mode. At this time, sound effects can also be produced.

In the present exemplary embodiment, mainly for the purpose of preventing wasting battery power of the portable game machine 200, the portable game machine 200 is operated in sleep mode when the user does not operate it for a predetermined period. For another purpose, that is, of preventing a burn on the display unit 24 of the portable game machine 200, it will also be effective to operate the portable game machine in a mode where image outputs on the display are suspended if no operations have been carried out for a predetermined period (such mode is referred to as burn-resistant mode). In the burn-resistant mode, no images are displayed on the display unit 24. Therefore, as in sleep mode, the user may erroneously think that the portable game machine 200 is turned off, and may carry out an erroneous operation, resulting in losing game data. According to the present exemplary embodiment, however, while being operated in burn-resistant mode, the portable game machine 200 can notify the user of such through the display 40. Therefore, it is possible to prevent an erroneous operation by the user.

In the present exemplary embodiment, such a case has been described as that where the TV game machine 100 connects to a single portable game machine 200 for use as an operation controller. This is not meant to be restrictive, and the TV game machine may connect to two or more portable game machines. In this case, the TV game machine 100 may continue normal game processing until all of the connected portable game machines are switched to the sleep mode, and when all have been so switched, suspend game processing and display an indicator of such on display 40. With this, even after any portable game machine is switched to the sleep mode, the other users using the other portable game machines can continue to play the game without being suspended.

In the present exemplary embodiment, the game program executed by the CPU 11 and the CPU 21 is supplied through the game disk 14 or the game cartridge 25. Alternatively, the game program may be supplied through other recording media. For example, the game program may be supplied from the TV game machine 100 to the portable game machine 200 not through the game cartridge 25, but through the communications cable 30. Also, the function achieved by the game program may be achieved by hardware.

While the invention has been described in detail, the foregoing description is in all aspects illustrative and not restrictive. It is understood that numerous other modifications and variations can be devised without departing from the scope of the invention.

What is claimed is:

1. A game system in which a first game machine is connected to at least a single second game machine for use as an operation controller for game play, comprising: a no-operation detector for detecting that the second game machine has not been operated by a user for a predetermined period and for generating a no-operation mode signal; a mode switching mechanism for switching, upon receipt of the no-operation mode signal from the no-operation detector, an operation mode of the second game machine from normal game processing mode to no-operation mode; and a notifying mechanism for notifying the user via an image or a sound that the second game machine is being operated in the no-operation mode, wherein the notification is provided by the first game machine, wherein the first and second game machines are capable of being operated independent of one another.

2. The game system according to claim 1, wherein the first game machine is powered by a home power supply, the second game machine is powered by a battery, and the no-operation mode is a power-saving mode for reducing power consumption from the battery by limiting an operation of the second game machine.

3. The game system according to claim 2, wherein the second game machine includes a display section for displaying a game screen, and in the power-saving mode, the game screen display on the display section is suspended.

4. The game system according to claim 1, wherein the second game machine includes a display section for displaying a game screen, and the no-operation mode is a burn-resistant mode for preventing a burn on the display section by suspending a screen display on the display section.

5. The game system according to claim 1, wherein when the notifying mechanism notifies the user that the second game machine is being operated in the no-operation mode, the notifying mechanism further notifies the user of a procedure for returning the operation mode of the second game machine from the no-operation mode to the normal game processing mode.

6. The game system according to claim 1, wherein the notifying mechanism notifies the user that the second game machine is being operated in the no-operation mode by causing a predetermined message to be displayed.

7. The game system according to claim 1, wherein the notifying mechanism notifies the user that the second game machine is being operated in the no-operation mode through an image having a different representation from an image displayed in the normal game processing mode.

8. The game system according to claim 1, wherein the notifying mechanism notifies the user that the second game machine is being operated in the no-operation mode through a different sound than a sound produced in the normal game processing mode.

9. The game system according to claim 1, wherein the second game machine has a plurality of operation buttons, and
the no-operation detector detects that the second game machine has not been operated by the user for a predetermined period when a state of the plurality of buttons has not changed for the predetermined period.

10. The game system according to claim 1, wherein the second game machine includes an acceleration sensor, and the no-operation detector detects that the second game machine has not been operated by the user for a predetermined period when values generated by the acceleration sensor for a predetermined period are within a predetermined range.

11. The game system according to claim 1, wherein the first game machine is connected to at least one of said second game machines, and the notifying mechanism notifies the user through an image or a sound, when all of the second game machines are being operated in the no-operation mode.

12. The game system according to claim 1, wherein the second game machine includes a power supply switch for switching the second game machine between on and off.

13. The game system according to claim 1, wherein the second game machine is a game machine operable to provide a game play independently from the first game machine.

14. A first game machine being removably connected to at least one second game machine as an operation controller, the second game machine having an operation mode which can be switched from normal game processing mode to no-operation mode when no operations have been carried out by a user for a predetermined time period, the first game machine comprising: an operation mode detector for detecting the operation mode of the second game machine; and a notifying mechanism for notifying the user that the second game machine is being operated in the no-operation mode through an image or a sound, wherein the first and second game machines are capable of being operated independent of one another.

15. The first game machine according to claim 14, wherein based on a sleep request signal from the second game machine, the operation mode detector detects that the operation mode of the second game machine is switched from the normal game processing mode to the no-operation mode.

16. A non-transitory computer-readable medium encoded with a game program to be executed on a game machine capable of being removably connected to at least another single game machine as an operation controller, the other game machine having an operation mode which can be switched from normal game processing mode to no-operation mode when no operations have been carried out for a predetermined time period, the computer-readable medium being encoded with said game program to cause the game machine to execute instructions for: detecting the operation mode of the other game machine; and notifying the user through an image or a sound that the other game machine is being operated in the no-operation mode, wherein the game machines are capable of being operated independent of one another.

17. A non-transitory computer-readable medium encoded with a game program to be executed on a game machine being used as an operation controller removably connected to another game machine for game processing, the computer-readable medium being encoded with said game program to cause the game machine to execute instructions for: detecting that no operations have been carried out by a user to the game machine for a predetermined time period; switching an operation mode of the game machine from normal game processing mode to no-operation mode based on the detection result in the detecting step; and notifying the other game machine with a sleep request signal that the operation mode of the game machine has been switched to the no-operation mode, wherein the game machines are capable of being operated independent of one another.

18. A game processing method for use in a game system in which a first game machine is connected to at least another single second game machine as an operation controller for game processing, the method comprising: detecting that no operations have been carried out by a user of the second game machine for at least a predetermined time period; switching an operation of the second game machine from normal game processing mode to no-operation mode based on the detection result; and notifying the user by the first game machine through an image or a sound that the second game machine is being operated in the no-operation mode, wherein the first and second game machines are capable of being operated independent of one another.

* * * * *